(12) United States Patent
Zheng (10) Patent No.: US 7,546,327 B2
(45) Date of Patent: Jun. 9, 2009

(54) PLATFORM INDEPENDENT RANDOMNESS ACCUMULATOR FOR NETWORK APPLICATIONS

(75) Inventor: Yuliang Zheng, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 915 days.

(21) Appl. No.: 11/018,806

(22) Filed: Dec. 21, 2004

(65) Prior Publication Data

US 2005/0135608 A1 Jun. 23, 2005

Related U.S. Application Data

(60) Provisional application No. 60/531,262, filed on Dec. 22, 2003.

(51) Int. Cl.
*G06F 1/02* (2006.01)
(52) U.S. Cl. ..................................... 708/250
(58) Field of Classification Search .......... 708/250–256
See application file for complete search history.

(56) References Cited

U.S. PATENT DOCUMENTS 5,483,598 A * 1/1996 Kaufman et al. .............. 380/43
5,778,069 A * 7/1998 Thomlinson et al. ......... 380/262
5,963,646 A * 10/1999 Fielder et al. ............... 380/259
7,302,457 B2 * 11/2007 Castejon-Amenedo et al. ... 708/250
2002/0090085 A1 * 7/2002 Vanstone et al. .............. 380/44
2002/0186838 A1 * 12/2002 Brandys ....................... 380/30
2005/0055391 A1 * 3/2005 Carlson et al. .............. 708/250

* cited by examiner

*Primary Examiner*—Tan V Mai
(74) *Attorney, Agent, or Firm*—K & L Gates LLP (57) ABSTRACT

A random number generator includes one or more pseudorandom data sources that generate pseudorandom data, a randomness accumulation facility that receives pseudorandom data from the one or more pseudorandom data sources, a storage facility that stores a random value generated by the randomness accumulation facility, and an application programming interface ("API"), operating independently from the operation of the randomness accumulation facility, that retrieves, upon request by a software application, the random value currently stored in the storage facility and provides a random number to the software application. The pseudorandom data is hashed with a previously-stored random value and a first counter value and may be encrypted before storing in the storage facility. Likewise, the API hashes the current random value with a second counter value before outputting the random number thus generated, decrypting the current value first if necessary.

60 Claims, 8 Drawing Sheets

PLATFORM INDEPENDENT RANDOMNESS ACCUMULATOR FOR NETWORK APPLICATIONS

CROSS-REFERENCE TO RELATED APPLICATION

This application is entitled to the benefit of, and claims priority to provisional U.S. Patent Application Ser. No. 60/531,262 filed Dec. 22, 2003 and entitled "PIRANA—A PLATFORM INDEPENDENT RANDOMNESS ACCUMULATOR FOR NETWORK APPLICATIONS," the entirety of which is incorporated herein by reference.

BACKGROUND OF THE PRESENT INVENTION

1. Field of the Present Invention

The present invention relates generally to the field of computer systems, and more particularly, to the field of random number generators for use by computer systems.

2. Background

As is well known, many computer and other electronic systems rely on processes that make use of random numbers. Examples of applications operating on such systems or making use of such processes include lotteries, gambling machines, video games, image processing and reconstruction, music and graphics composition, scientific and financial modeling simulation, program and algorithm testing, equation-solving, and computer security. In particular, computer security applications such as cryptography, digital signatures, and protected communication protocols, make use of random numbers as a fundamental building block for strengthening and securing the confidentiality of electronic communications.

As is also well known, cryptography is the art and science of converting data or other information from its normal, easily comprehensible form into an incomprehensible format, rendering it unreadable without secret knowledge. In contemporary usage, cryptography is often used to provide security for the communications that occur between separate computer devices, sometimes referred to herein as an entity, and involves authentication, confidentiality, and integrity.

Authentication involves ensuring each entity communicating with one another is who the other entity or entities think it is. In an exemplary authentication protocol, a first entity of a type referred to as a client requests access, over a network, to password-protected information that is stored on a second entity of a type referred to as a server. The server responds with a random challenge, which is typically a random number that is often combined with other information. The client encrypts the random challenge using a password as a key and returns the encrypted challenge to the server. The server encrypts the same random challenge with the client's password, which the server obtains from its own password database. The server compares the two results, and if the results match, then the server has thereby authenticated the client without the client ever sending its password over the network. The generation and use of random numbers are thus critical in ensuring that no unauthorized entity observing an encrypted random challenge can impersonate the client by similarly responding to new random challenges.

Confidentiality, on the other hand, involves ensuring that no unauthorized entity listening to a communication is able to extract meaningful information from the data being communicated back and forth. Confidentiality is typically provided through data encryption which is the process of combining the original message with a cryptographic key in a defined manner to encrypt the message. In an ideal cryptosystem, only an entity with a particular decryption key can decrypt the encrypted message. By ensuring that this decryption key cannot be predicted or replicated and that only the intended recipient of the message has the required decryption key, the message can be protected from observation by an unauthorized entity.

Cryptographic keys can be symmetric or asymmetric. A symmetric key may be used for both encrypting data and decrypting the same data. On the other hand, asymmetric keys are produced in pairs, with each pair including a public key for encrypting data and a private key for decrypting data. The strength of a cryptosystem lies in the strength of the key which is a function of not only the number of bits in the key but also the randomness of the number used to generate the key. The generation and use of random numbers are thus critical in ensuring the confidentiality of a message.

Finally, integrity involves ensuring that no undetected changes are made to a particular communication. This may be accomplished using digital signatures. A digital signature is a fixed-length binary string unique to a given message and signed with a private key. The unique string is typically known as a message digest or cryptographic hash. Because the unique string is signed with the originating entity's private key, any entity with the originating entity's public key can decrypt the message and identify the owner of the private key and thereby identify the entity that originated the message. By generating another hash of the message using the same hashing algorithm as the originating entity and comparing the new hash with the signed hash, the recipient can verify that the message did not change after leaving the originator. The generation and use of random numbers is thus critical in ensuring that a signature generated using random numbers is of sufficient strength to avoid forgery of the signature.

In computer and other electronic systems, random numbers are a sequence of independent numbers with a specified distribution and a specified probability of falling in any given range of values. An ideal random number generator provides a stream of uniformly distributed, non-deterministic, independent bits over an infinite data set. A wide variety of random number generators have been created in an attempt to reach this ideal. Unfortunately, to a greater or lesser degree, known random number generators fall short of this ideal, and instead provide only what more properly is characterized as pseudorandom numbers.

For example, computer systems often use modular software-based random number generators. These solutions are typically created independently and then added to a computer system with relative ease. Unfortunately, software random number generators typically require a seed which is used as an operand in a mathematical algorithm to create a random number. The sequence of numbers generated by such software random number generators will eventually repeat, however, thus making it easier to predict a particular random number generator, thereby diminishing its usefulness.

Incorporating randomness into the seed and using sufficiently long mathematical computations help to increase the randomness of the numbers generated thereby. Typically, the seed is generated from bits of data collected from data sources within the computer system, including such the system clock, processes executing in the computer system, status registers, keystrokes, key press timing, and mouse movements, and the like. System interrupts and event handling, however, may reduce the effective randomness of at least some of these seed sources within different computer systems. Thus, a need exists for a random data generator that is more likely to be able to generate non-repeating random or pseudorandom numbers than previously possible.

Another drawback of existing random number generators is their susceptibility to decryption, decoding, deciphering or the like through a combination of traditional cryptography techniques and traffic analysis. In other words, by examining a sufficient number of random numbers generated by the generator, it may be possible to derive information about the generation process, thereby making it easier to predict future random numbers. As computer analysis techniques and processing capabilities become ever-greater, this poses a serious threat to the security of known random number generators. A more secure random data generator is thus needed in order to prevent such activities.

SUMMARY OF THE PRESENT INVENTION

Broadly defined, the present invention according to one aspect is a random number generator, including: one or more pseudorandom data sources that generate first data; random state storage that receives and stores a random number; and a one-way hash element, whose output is coupled to the input of the random state storage, that hashes first data from the one or more pseudorandom data sources with a current random value from the random state storage.

In features of this aspect, the hashed result from the one-way hash element is loaded into the random state storage as a new random value; the random number generator includes a counter whose output is received by the one-way hash element, and the current value of the counter is hashed, by the one-way hash element, with the first data and the current value contained in the random state storage; the counter is incremented each time a new value is loaded from the output of the one-way hash element into the random state storage; the counter resides in non-volatile memory and is restored to a previous value upon restart; the random number generator includes a query manager, interposed between the one or more pseudorandom data sources and the one-way hash element, that gathers pseudorandom data from the one or more pseudorandom data sources and provides it to the one-way hash element; the query manager includes a polling scheduler that determines when to gather pseudorandom data from each of the pseudorandom data sources; and the one-way hash element is a first one-way hash element, and the random number generator includes a second one-way hash element that receives the current random value from the random state storage and hashes the current random value with a separate value, the output of the second one-way hash element being designated as the random number that is provided as an output by the random number generator.

In other features of this aspect, the random number generator includes a counter whose current value is the separate value with which the current random value, from the random state storage, is hashed by the second one-way hash element; the counter is incremented each time a new random number is provided by the random number generator; the counter resides in non-volatile memory and is restored to a previous value upon restart; the current random value is stored in the random state storage in encrypted form, and wherein the random number generator comprises a decryption element interposed between the random state storage and the one-way hash element for decrypting the current random value before being hashed by the one-way hash element; the random number generator includes an encryption element, interposed between the output of the one-way hash element and the input of the random state storage, that encrypts the hashed result from the one-way hash element before the hashed result is loaded into the random state storage; the random number generator includes an encryption element, interposed between the output of the one-way hash element and the input of the random state storage, that encrypts the hashed result from the one-way hash element before the hashed result is loaded into the random state storage; and the random state storage resides in non-volatile memory and is restored to a previous value upon restart.

The present invention according to a second aspect is a method of generating random data, including: generating pseudorandom data via one or more pseudorandom data sources; hashing the pseudorandom data with a stored value of random data; storing the result of the hashing step in a memory location for retrieval when a random number is requested; and repeating the generating, hashing and storing steps on an ongoing basis, wherein the stored value hashed in each subsequent hashing step is the result of a previous hashing step.

In features of this aspect, hashing includes hashing the pseudorandom data with the stored value of random data from the memory location; the memory location is a first memory location, the method includes storing the current value of a counter in a second memory location, and hashing includes hashing the pseudorandom data with the stored value of random data and the stored value of the counter; the method includes incrementing the counter whenever the hashing step is carried out; the method includes gathering pseudorandom data from the one or more pseudorandom data sources, and selecting a subset of the pseudorandom data to be hashed with the stored value of random data; the method includes determining when to gather pseudorandom data from each of the pseudorandom data sources; the method includes retrieving the stored value of random data from the memory location, hashing the retrieved value with a separate value, and outputting the result of the foregoing hashing step as a random number; the memory location is a first memory location, the method includes storing the current value of a counter in a second memory location, and hashing the retrieved value with a separate value includes hashing the retrieved value with the stored value of the counter; and the method includes incrementing the counter whenever the retrieved value is hashed with the stored value of the counter.

In other features of this aspect, the step of storing the result of the hashing step includes storing the result of the hashing step in the memory location in encrypted form; the method includes decrypting the stored value of random data in the memory location before hashing the stored value with the pseudorandom data; the method includes encrypting the result of the hashing step before storing the result in the memory location; the method includes encrypting the result of the hashing step before storing the result in the memory location; and storing the result of the hashing step includes storing the result of the hashing step in non-volatile memory, and the method includes discontinuing the generating, hashing and storing steps by rebooting a computer, restoring the previous stored value when the computer is restarted, and again repeating the generating, hashing and storing steps on an ongoing basis, where the stored value hashed with the pseudorandom data in the first hashing step after the computer is restarted is the restored previous value, and where the stored value hashed with the pseudorandom data in each subsequent hashing step is the result of a previous hashing step.

The present invention according to a third aspect is a random number generator including: one or more pseudorandom data sources that generate pseudorandom data; random state storage that receives and stores a random number derived from the pseudorandom data that is generated by the one or more pseudorandom data sources; and a one-way hash element that receives a current random value from the random state storage and hashes the current random value with a separate value, the output of the one-way hash element being designated as the random number that is provided as an output by the random number generator.

In features of this aspect, the random number generator includes a counter whose current value is the separate value with which the current random value, from the random state storage, is hashed by the second one-way hash element; the counter is incremented each time a new random number is provided as an output by the random number generator; the counter is incremented each time the random state storage receives and stores a new random number; the random number generator includes an incrementer that controls how the counter is incremented; the counter resides in non-volatile memory and is restored to a previous value upon restart; the current random value is stored in the random state storage in encrypted form, and the random number generator includes a decryption element interposed between the random state storage and the one-way hash element for decrypting the current random value before being hashed by the one-way hash element; and the random state storage resides in non-volatile memory and is restored to a previous value upon restart.

The present invention according to a fourth aspect is a method of generating a random number, including: generating pseudorandom data via one or more pseudorandom data sources; deriving a random value from the pseudorandom data; storing the random value in a memory location; hashing the stored random value with a separate value; and outputting the hashed result as a generated random number.

In features of this aspect, at least the hashing and outputting steps are repeated on an ongoing basis, and the separate value is changed before at least some of repeated hashing steps are executed; the separate value is the value of a counter, and the method includes incrementing the counter whenever the hashing step is carried out; the separate value is the value of a counter, and the method includes incrementing the counter whenever a new random value is stored in the memory location; the step of storing the random value in a memory location includes storing a random value in a memory location in encrypted form; and the method includes decrypting the random value stored in the memory location before hashing the random value with the separate value.

The present invention according to a fifth aspect is a random number generator, including one or more pseudorandom data sources that generate pseudorandom data; a randomness accumulation facility that receives pseudorandom data from the one or more pseudorandom data sources; a storage facility that stores a random value generated by the randomness accumulation facility; and an application programming interface, operating independently from the operation of the randomness accumulation facility, that retrieves, upon request by a software application, the random value currently stored in the storage facility and provides a random number to the software application.

In features of this aspect, the randomness accumulation facility defines a first module and the application programming interface defines a second module, and at least one of the first and second modules includes a one-way hash element that hashes data received by the module and provides, as output, random data derived from the hashed output of the one-way hash element; the first module includes a one-way hash element that hashes the pseudorandom data with a current random value from the storage facility; the hashed result from the one-way hash element is loaded into the storage facility as a new random value; the first module includes a query manager, interposed between the one or more pseudorandom data sources and the one-way hash element, that gathers pseudorandom data from the one or more pseudorandom data sources and provides it to the one-way hash element; the query manager includes a polling scheduler that determines when to gather pseudorandom data from each of the pseudorandom data sources; the random number generator includes a counter for each respective one-way hash element, the output of the counter is received by the respective one-way hash element, and the current value of the counter is hashed, by the one-way hash element, with the data received by the module in which the one-way hash element is included; and each respective counter is incremented when its corresponding one-way hash element carries out its hash operation.

In other features of this aspect, the first module includes one of the one-way hash elements, such one-way hash element having an output coupled to an input of the storage facility and arranged to hash pseudorandom data from the one or more pseudorandom data sources with a current random value from the storage facility and the current value of the respective counter; the second module includes one of the one-way hash elements, such one-way hash element arranged to hash a current random value from the storage facility with the current value of the respective counter; the output of the one-way hash element of the second module is designated as the random number that is provided as an output by the random number generator; the counter resides in non-volatile memory and is restored to a previous value upon restart; the current random value is stored in the storage facility in encrypted form; the randomness accumulation facility includes an encryption element that encrypts the generated random value before storing the random value in the storage facility; the application programming interface includes a decryption element that decrypts the random value stored in the storage facility before providing it as a random number; and the random value is stored in non-volatile memory in the storage facility and is restored to a previous value upon restart.

The present invention according to a sixth aspect is a method of generating a random number, including: generating pseudorandom data via one or more pseudorandom data sources; hashing the pseudorandom data with a stored value of random data; storing the result of the hashing step as a current random value in a memory location; repeating the generating, hashing and storing steps on an ongoing basis, wherein the stored value hashed with the pseudorandom data in each subsequent hashing step is the result of a previous hashing step; independently from the generating, hashing and storing steps, retrieving the current random value from the memory location; hashing the retrieved random value with a separate value; and outputting the hashed result as a generated random number.

In features of this aspect, the step of hashing the pseudorandom data with a stored value of random data includes hashing the pseudorandom data with a stored value of random data and with a counter value, and the method includes incrementing the counter value each time the counter value is hashed; the step of hashing the retrieved random value with a separate value includes hashing the retrieved random value with a counter value, and the method includes incrementing the counter value each time the counter value is hashed; the method includes encrypting, before storing the current random value in the memory location, the result of the step of hashing the pseudorandom data with a previously-stored value of random data; the method includes decrypting, before hashing the retrieved random value with a separate value, the retrieved random value; and storing the result of the hashing step includes storing the result of the hashing step in a memory location in non-volatile memory, and the method includes discontinuing the generating, hashing and storing steps by rebooting a computer, restoring the previous stored current random value when the computer is restarted, and again repeating the generating, hashing and storing steps on an ongoing basis, where the stored value hashed with the pseudorandom data in the first hashing step after the computer is restarted is the restored previous value, and where each subsequent hashing step is the result of a previous hashing step.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION OF THE PREFERRED EMBODIMENTS

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

Figure 1:
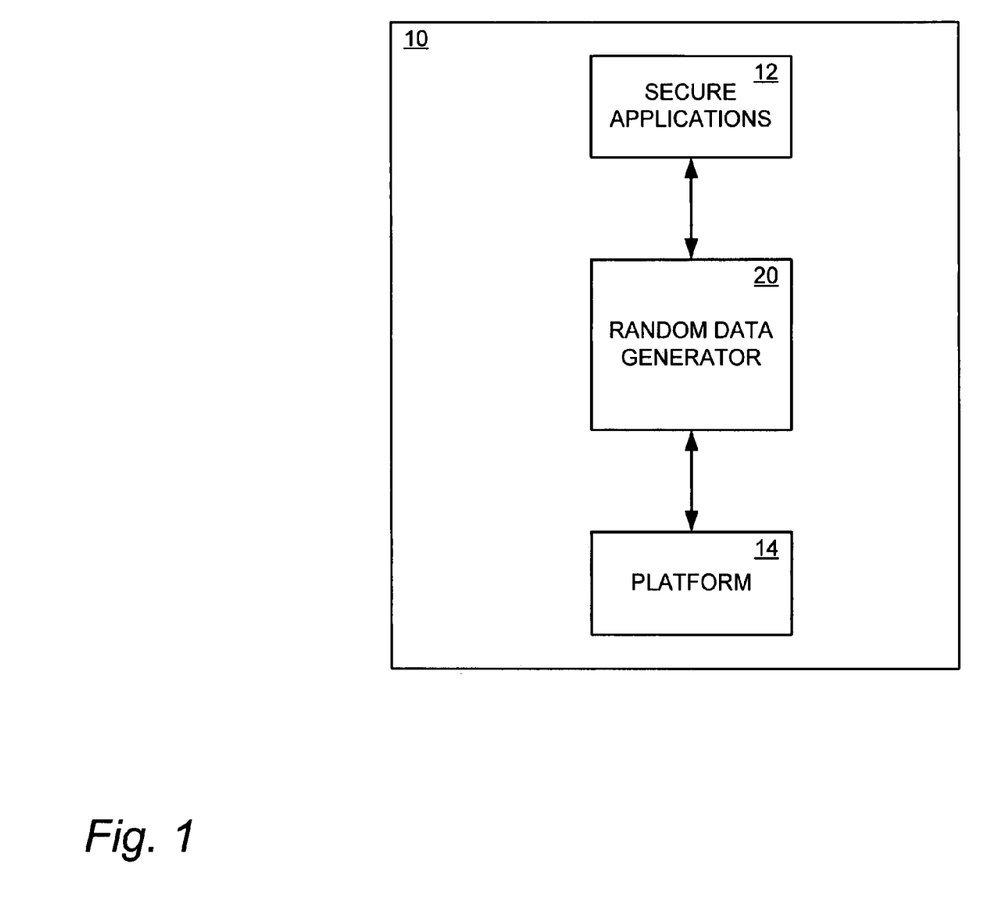
FIG. 1 is a block diagram of a random data generator, embedded within a computer system, in accordance with a preferred embodiment of the present invention.

FIG. 1 is a block diagram of a random data generator 20, embedded within a computer system 10, in accordance with a preferred embodiment of the present invention. Applications 12 within the computer system 10 call on the random data generator 20 when a random number is needed. The random data generator 20, in turn, is connected to the computer system's operating platform 14, which includes both the hardware of the computer system 10 and its operating system.

Figure 2:
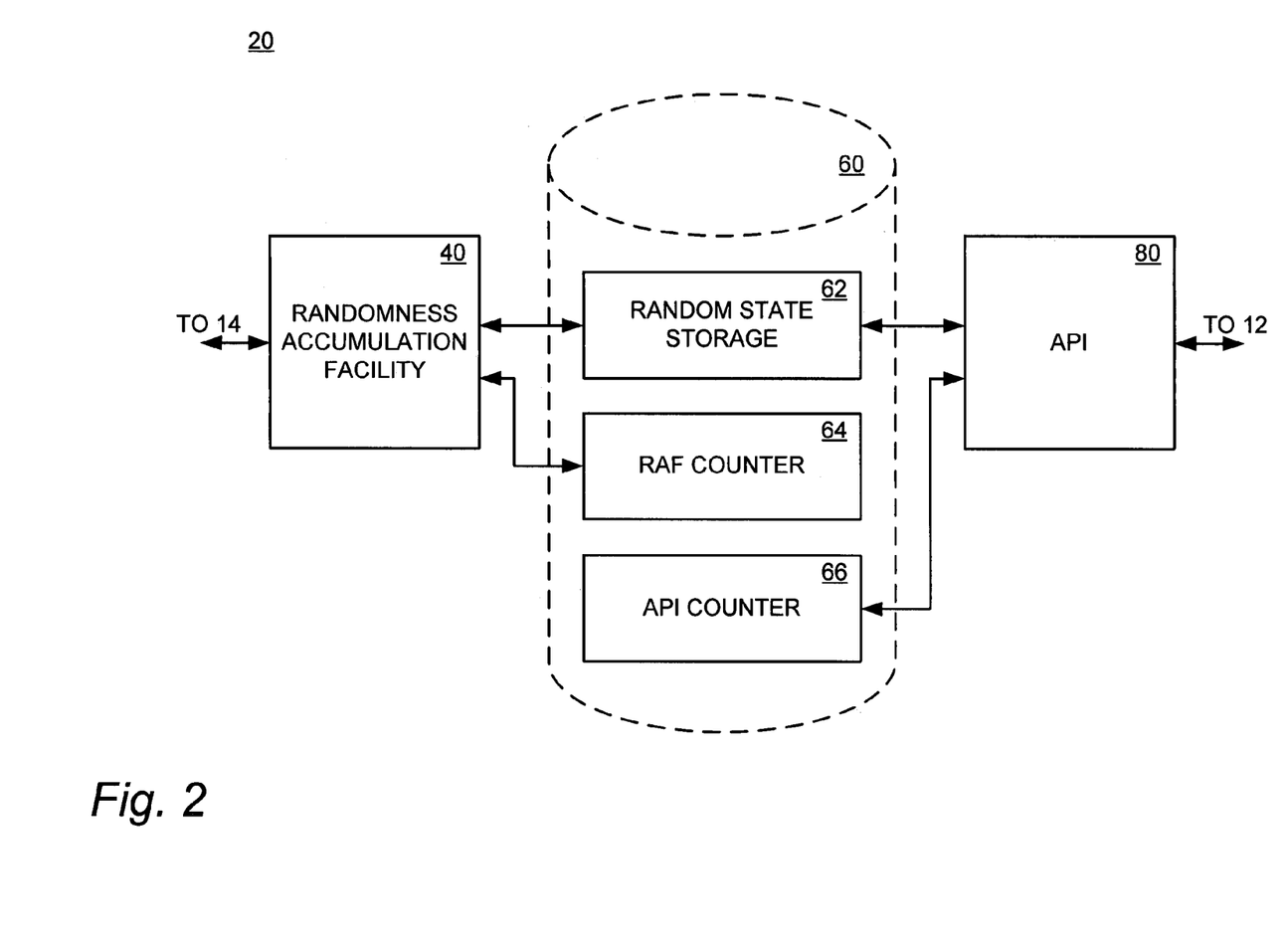
FIG. 2 is a block diagram of the components of the random data generator of FIG. 1.

FIG. 2 is a block diagram of the components of the random data generator 20 of FIG. 1. The random data generator 20 includes a randomness accumulation facility 40, a storage facility 60, and an application programming interface ("API") 80. The storage facility 60, which may be a dedicated database or datastore or may be part of the data storage elements of the computer system 10, includes random state storage 62 for holding a current random state, as well as two counters 64, 66. Preferably, the random state storage 62 and the two counters 64, 66 reside in persistent or non-volatile storage, such as the system state storage typically provided in a general purpose computer, for a purpose to be made evident hereinbelow. The randomness accumulation facility 40, which depends on input data from the platform 14, is connected to the random state storage 62 and the first counter 64. The API 80, which provides the pseudorandom data to the applications 12, is connected to the random state storage 62 and the second counter 66.

Figure 3:
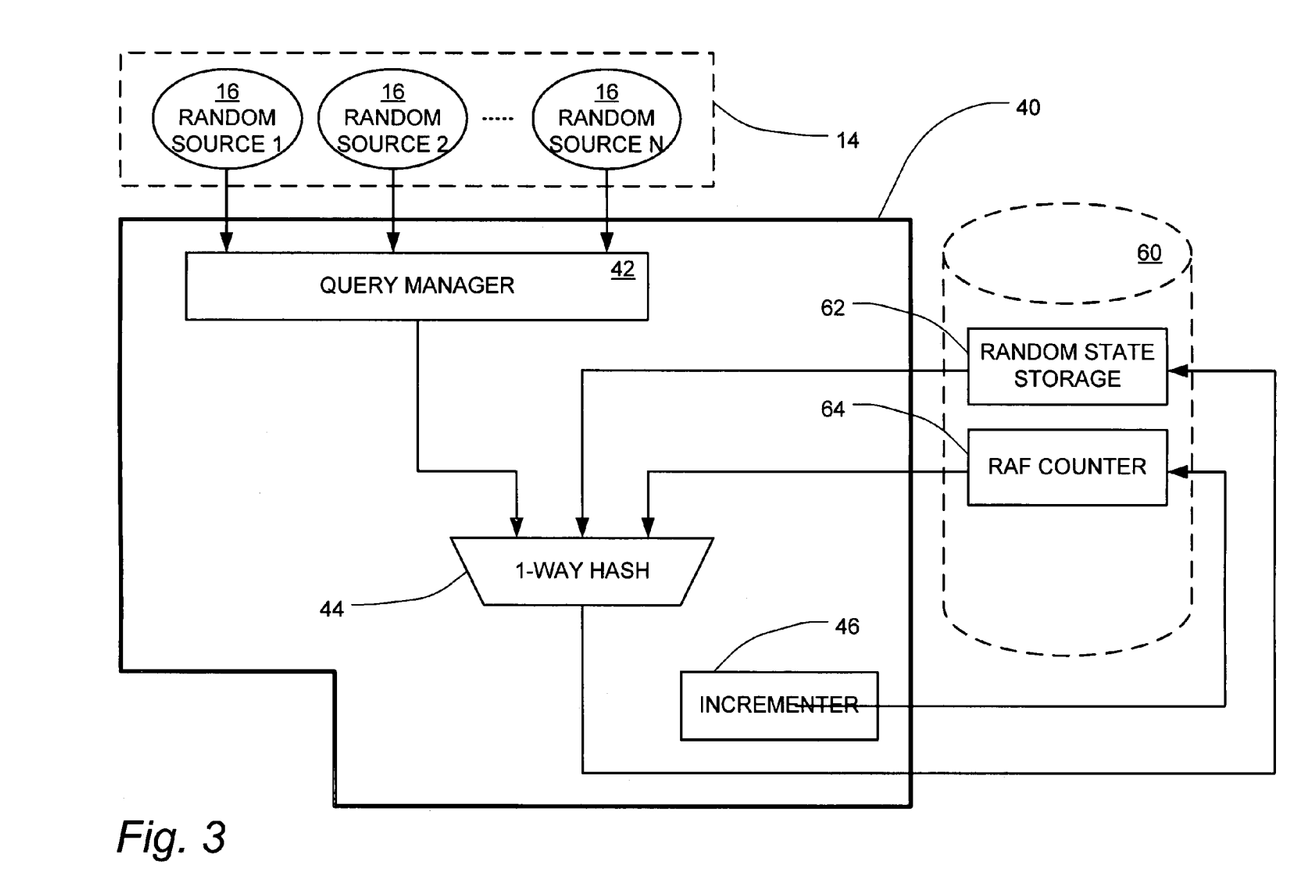
FIG. 3 is a block diagram illustrating the randomness accumulation facility of FIG. 2 and its interconnection to the computer's operating platform and the storage facility.

FIG. 3 is a block diagram illustrating the randomness accumulation facility 40 of FIG. 2 and its interconnection to the computer's operating platform 14 and the storage facility 60. The randomness accumulation facility 40 includes a query manager 42, a first one-way hash element 44, and a first incrementer 46 for the first counter 64, which is sometimes referred to hereinafter as the RAF counter. The query manager 42 receives data from at least one, and preferably considerably more than one, environmental or other pseudorandom data source 16. Such sources 16 are described in greater detail hereinbelow. Meanwhile, the first one-way hash element 44 also receives, as input, the current value of the random state storage 62 and the current value of the RAF counter 64, which is incremented regularly by the first incrementer 46. The hash element 44 may utilize any one-way hash algorithm, including both dedicated algorithms, such as SHA-1 and the like, and algorithms that are built from symmetric ciphers. The output of the first one-way hash element 44 is used to update the random state storage 62, which is then used by the API 80 as described below.

The query manager 42 is responsible for querying each of the various environmental data sources 16 to derive data that may or may not be random or pseudorandom by itself but whose degree of randomness, when combined or placed in cyclical rotation with data from other sources 16, becomes much more random. Each data source 16 may be any source of non-constant data that is available to the randomness accumulation facility 40, but is preferably a source of data having a significant degree of relative randomness. Such data sources 16 preferably include a variety of environmental data sources that are resident in the platform 14, but may also include other pseudorandom data sources, including other random number generators. Data sources suitable for use in the preferred embodiments of the present invention include disks or disk drives, audio sources, system clocks, packet arrival times, key strokes, mouse movements, swap area content, input/output buffers, seed request time, system/network status information, process start/finish times, hardware information, and a wide variety of other devices, elements, processes and the like.

In its simplest form, the query manager 42 gathers data sets from each of the various data sources 16 but outputs, to the first one-way hash element 44, only a single data set, from a single data source 16, at a time. However, the query manager may further include one or more registers and/or accompanying logic for concatenating or performing mathematical or other functions on the data received from the various sources 16 to introduce a higher degree of randomness to the data that is provided to the hash element 44. In addition, because the various data sources 16 are likely to generate new data at differing rates that are often independent from one another, the query manager 42 preferably includes a polling scheduler (not shown) to determine how often to poll or query each data source 16 and to accumulate it accordingly. The polling scheduler preferably polls or queries the faster-changing data sources 16 more frequently than the slower-changing ones.

Figure 4:
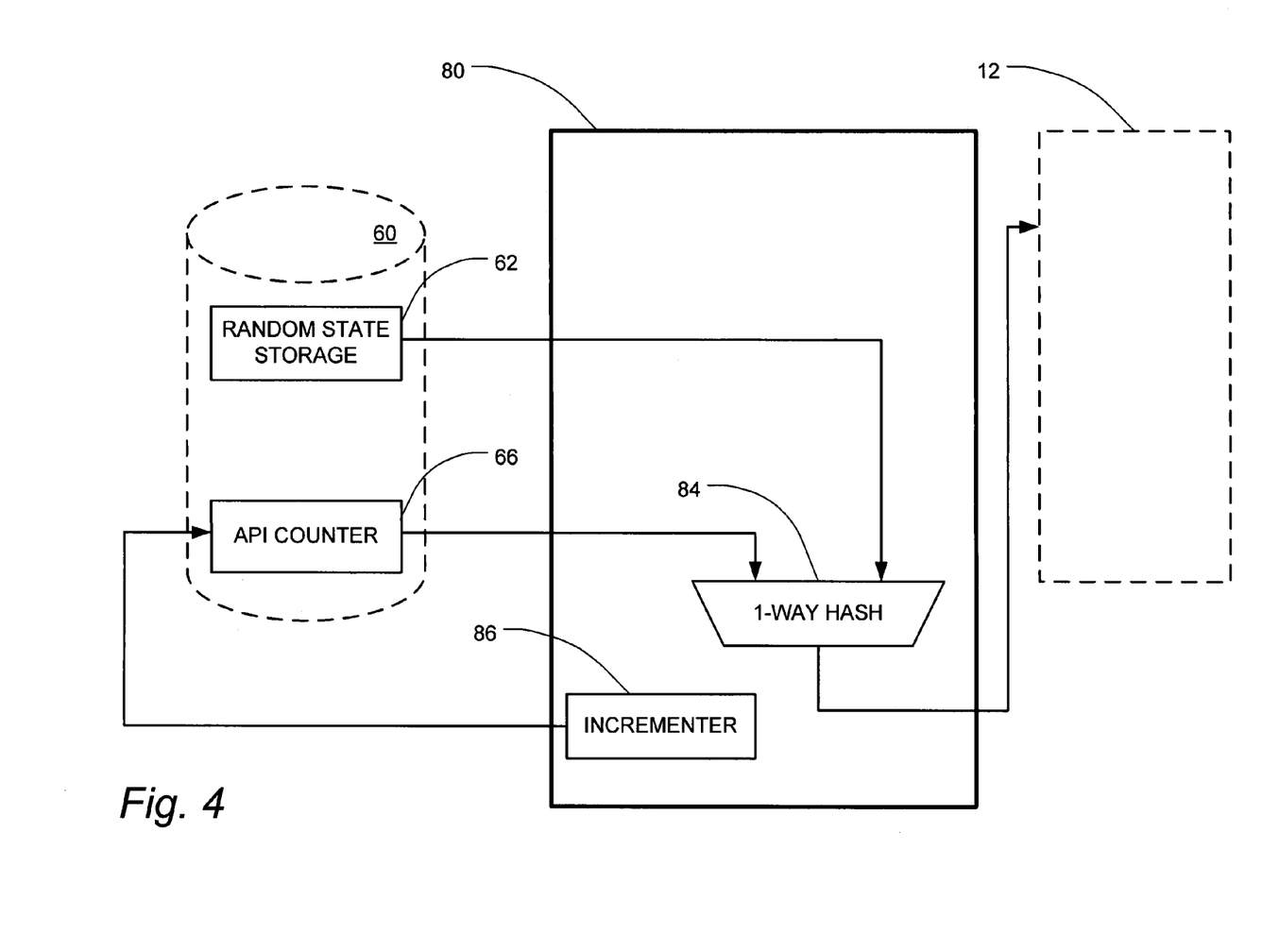
FIG. 4 is a block diagram of the application programming interface of FIG. 2 and its interconnection to the storage facility and the application.

FIG. 4 is a block diagram of the API 80 of FIG. 2 and its interconnection to the storage facility 60 and the application 12. The API 80 includes a second one-way hash element 84 and a second incrementer 86. Like the first one-way hash element 44, the second hash element 84 may utilize any one-way hash algorithm, including both dedicated algorithms, such as SHA-1 and the like, and algorithms that are built from symmetric ciphers. The second one-way hash element 84 receives as input the current value of the random state storage 62 and the current value of the API counter 66, which is incremented regularly by the second incrementer 86. The output of the second one-way hash element 84 is provided to the application 12 that requested the random data.

In operation, the random state storage 62 is used to store a current random value, which as an initial matter may be set to a predetermined value, set to a value produced by a random (pseudorandom) number generator process, or allowed to float to a predictable or unpredictable value. Once the computer system 10, including the random number generator 20 of the present invention, is initialized, the query manager 42 repeatedly queries the various data sources 16 and generates a random number seed according to the functionality described hereinabove. The random number seed is hashed with the current random value (as stored in the random state storage 62) and the current value of the RAF counter 64 to produce a new random value. The new random value is then stored in the random state storage 62, replacing the value previously stored there. This process is repeated indefinitely.

While the above-described process is executing, the RAF counter 64 is also being incremented. In its simplest form, the RAF counter 64 may be incremented whenever the hash function is performed by the first hash element 44. It will be apparent that, depending on the design of the first one-way hash element 44, the need for an incrementer 46 that is separate from the hash element 44 may be obviated. However, as shown in FIG. 3, the incrementer 46 may operate separately from the hash element 44. This may facilitate the use of an incrementing frequency that differs from that of the hash function and/or further separates the operation of the incrementer 46 from that of the first hash element 44. Regardless of the implementation, the incrementer 46 preferably increments the RAF counter 64 at least as often as the random state storage 63 is updated.

An important purpose of the inclusion of the first one-way hash element 44 is to ensure that the pseudorandom data produced by the query manager 42 is not directly accessible or visible to applications 12 that requesting random numbers. Further, by incorporating the RAF counter 64 into the hash function, the randomness accumulation facility 40 thus makes virtually certain that the inputs to the first one-way hash element 44 will vary each time the hash function is carried out.

Meanwhile, and independently from the operation of the randomness accumulation facility 40, the API 80 receives and fulfills requests from the applications 12 for random numbers. When a request for a random number is received, the current value of the random state storage 62 may be hashed with the current value of the API counter 66. It is the output of the second one-way hash element 84 that is provided to the application 12. The inclusion of the second one-way hash element 84 ensures that the current random value produced by the randomness accumulation facility 40 and stored in the random state storage 62 is not directly accessible to the applications. Because the applications 12 require only that the data they receive is as random as possible, they do not require the cleartext "unhashed" random value. In other words, from the perspective of a requesting application 12, it does not matter whether it receives the current random value stored in the random state storage 62 or a hashed product or output of that value.

Further, the inclusion in the hash function of the value of a second counter 66, separate from the first counter 64, makes virtually certain that the inputs to the second one-way hash element 84 will vary each time the hash function is carried out. This, in turn, helps to ensure that an application 12 may not be used to derive information about actual values stored in the random state storage 62 such as by repeatedly forcing the hash function to be carried out. As with the RAF counter 64, the API counter 66, in its simplest form, may be incremented whenever the hash function is performed by the second hash element 84. It will be apparent that, depending upon the design of the second one-way hash element 84, the need for an incrementer that is separate from the hash element 84 may be obviated. However, as shown in FIG. 4, the incrementer 86 may operate separately from the hash element 84. This may facilitate the use of an incrementing frequency that differs from that of the hash function and/or further separates the operation of the incrementer 86 from that of the first hash element 84. Regardless of the implementation, it preferably increments the API counter 66 at least as often as the second hash element 84 carried out its hash function, and at least as often as the random state storage 62 is updated by the randomness accumulation facility 40.

As described previously, the random state storage 62 and the two counters 64, 66 preferably reside in persistent or non-volatile storage, such as the system state storage typically provided in a general purpose computer. This permits the values stored therein to be preserved as part of a computer's regular state backup process, so that if the computer or computers in which the present invention is embodied are rebooted or otherwise restarted, the values are maintained, even after a system crash. This, in turn, decreases the possibility that a repeating sequence of values could be forced to occur by intentionally restarting the random number generator, thereby forcing the random state storage 62 and the two counters 64, 66 to be loaded with known values.

Figure 5:
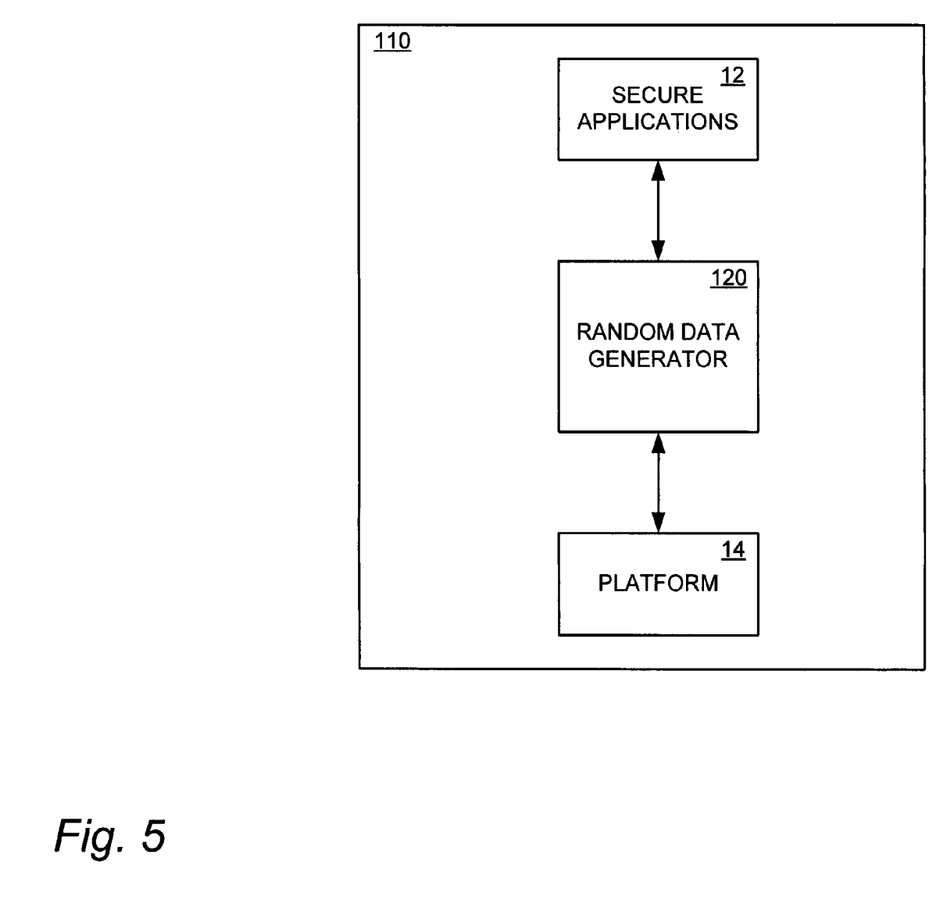
FIG. 5 is a block diagram of a random data generator, embedded within the same computer system shown in FIG. 1, in accordance with an alternative preferred embodiment of the present invention.
Figure 6:
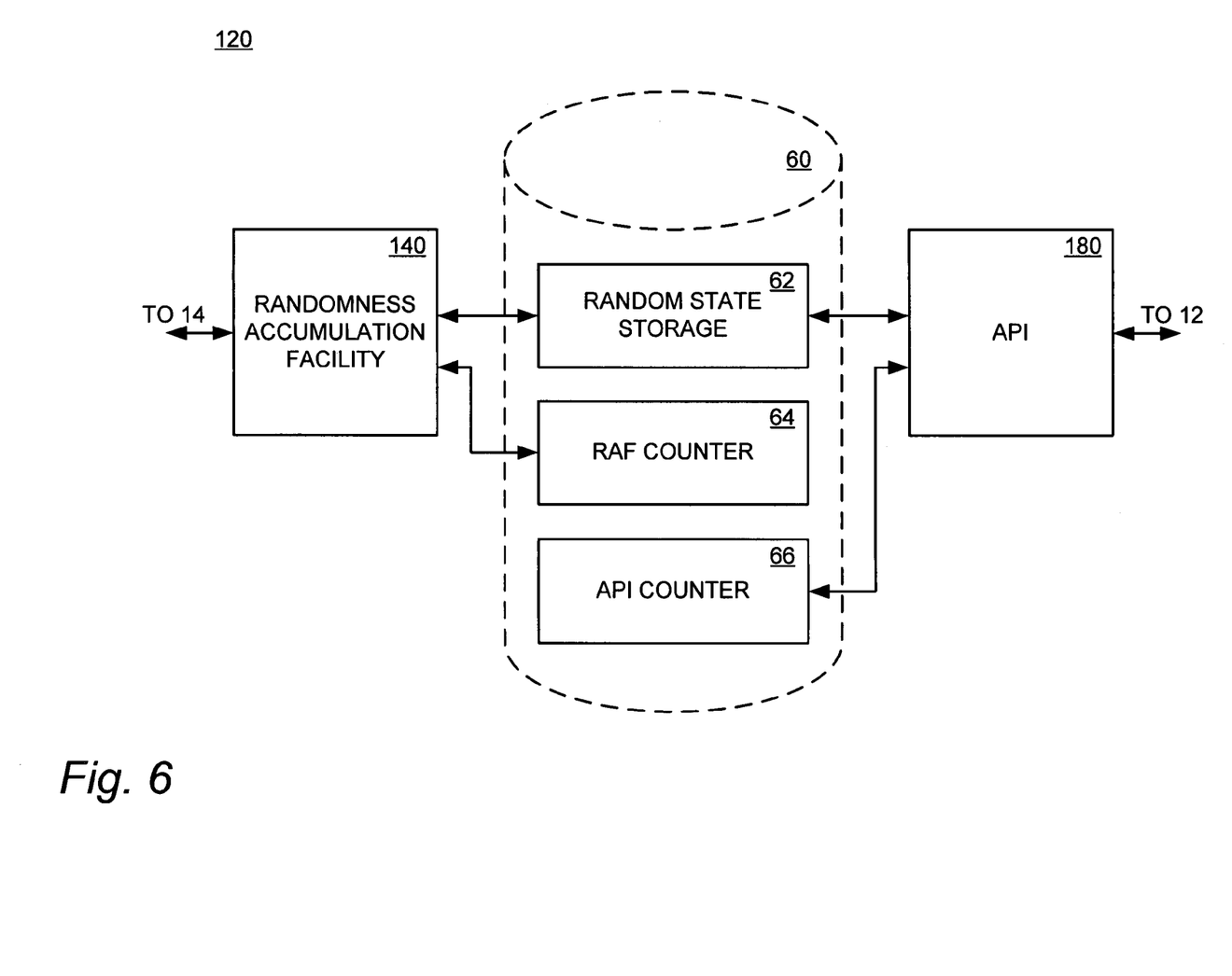
FIG. 6 is a block diagram of the components of the alternative random data generator of FIG. 5.

FIG. 5 is a block diagram of a random data generator 120, embedded within the same computer system 10 shown in FIG. 1, in accordance with an alternative preferred embodiment of the present invention, and FIG. 6 is a block diagram of the components of the alternative random data generator 120 of FIG. 5. Similar to the embodiment of FIG. 2, the alternative random data generator 120 includes a randomness accumulation facility 140, a storage facility 60, and an API 180. The storage facility 60 may be essentially identical to that of the first embodiment, while the randomness accumulation facility 140 and the API 180 may be nearly identical to the respective components 40, 80 described previously, but with important modifications to provide additional security as described below.

Figure 7:
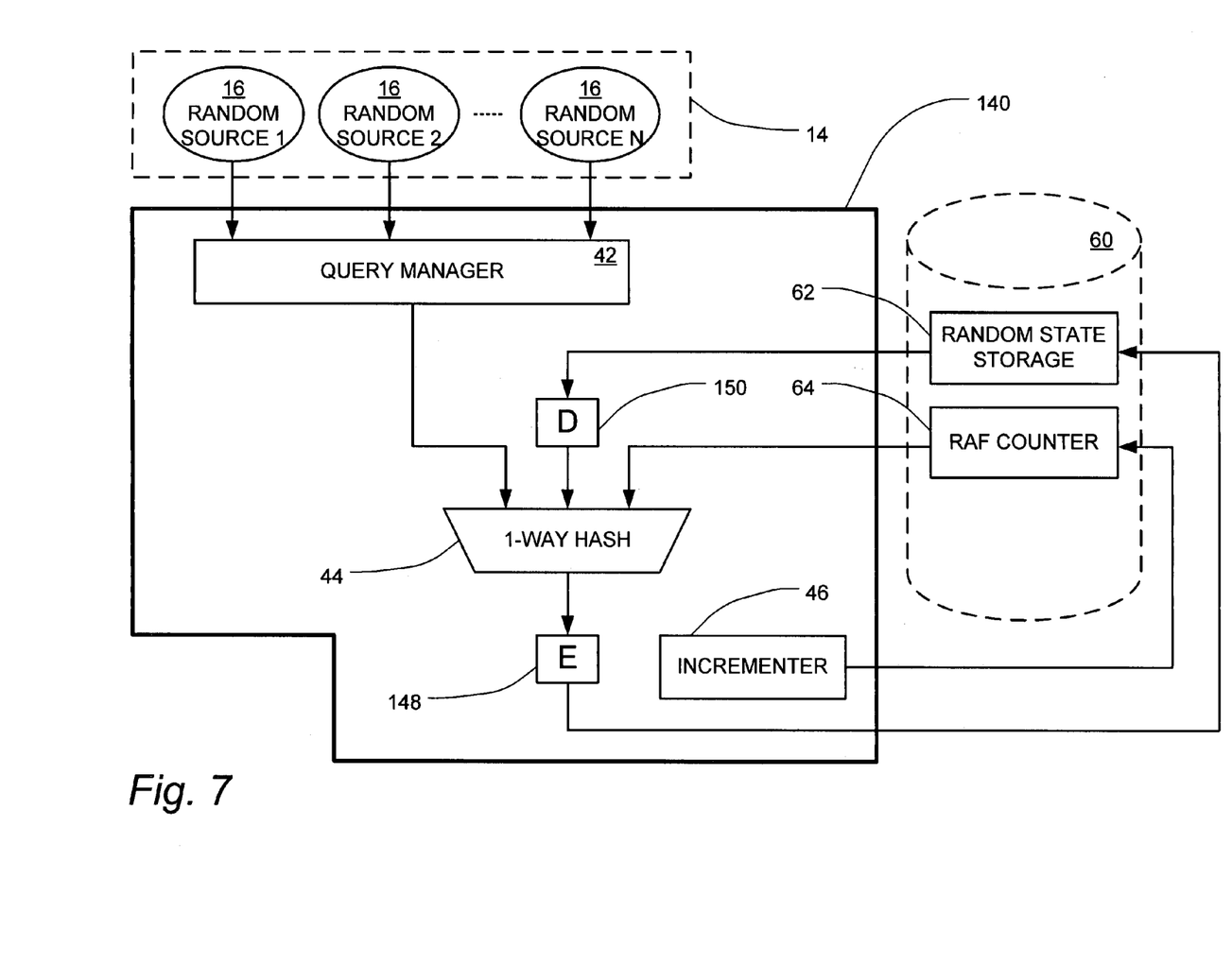
FIG. 7 is a block diagram of the alternative randomness accumulation facility of FIG. 6 and its interconnection to the computer's operating platform and the storage facility.

FIG. 7 is a block diagram of the alternative randomness accumulation facility 140 of FIG. 6 and its interconnection to the computer's operating platform 14 and the storage facility 60. The alternative randomness accumulation facility 140 once again includes a query manager 42, a first one-way hash element 44, and a first incrementer 46 for the first counter 64. Each of these elements 42, 44, 46 is similar to, and carries out the same function as, the corresponding element of the randomness accumulation facility 40 of the embodiment of FIG. 3. However, in this alternative randomness accumulation facility 140, the random value is stored in the random state storage 62 in an encrypted or otherwise secured state.

In order to accomplish this, the randomness accumulation facility 140 further includes at least one and preferably two cryptographic elements 148, 150. As used herein, "cryptographic" should be understood to refer to any element capable of carrying out a cryptographic process, including encryption/decryption, hashing, and the like. However, in the following description, "encryption" or "encrypt" shall be understood to refer to a cryptographic process that scrambles or otherwise encodes a value from cleartext into ciphertext, and "decryption" or "decrypt" shall be understood to refer to a cryptographic process that unscrambles or otherwise decodes a value from ciphertext into cleartext.

The first cryptographic element 148 is an encryption element that may be interposed between the output of the first one-way hash element 44 and the input of the random state storage 62, while the second cryptographic element 150 is a decryption element that may be interposed between the output of the random state storage 62 and the first one-way hash element 44. In operation, the value produced by the first one-way hash element 44 is thus encrypted by the encryption element 148 before being stored in the random state storage 62. Further, when a new random value is to be produced, the current random value of the random state storage 62 is retrieved and decrypted by the first decryption element 150 before being provided to the first one-way hash element 44. Otherwise, the operation of the alternative embodiment of the randomness accumulation facility 140 is similar to that of the first embodiment.

Figure 8:
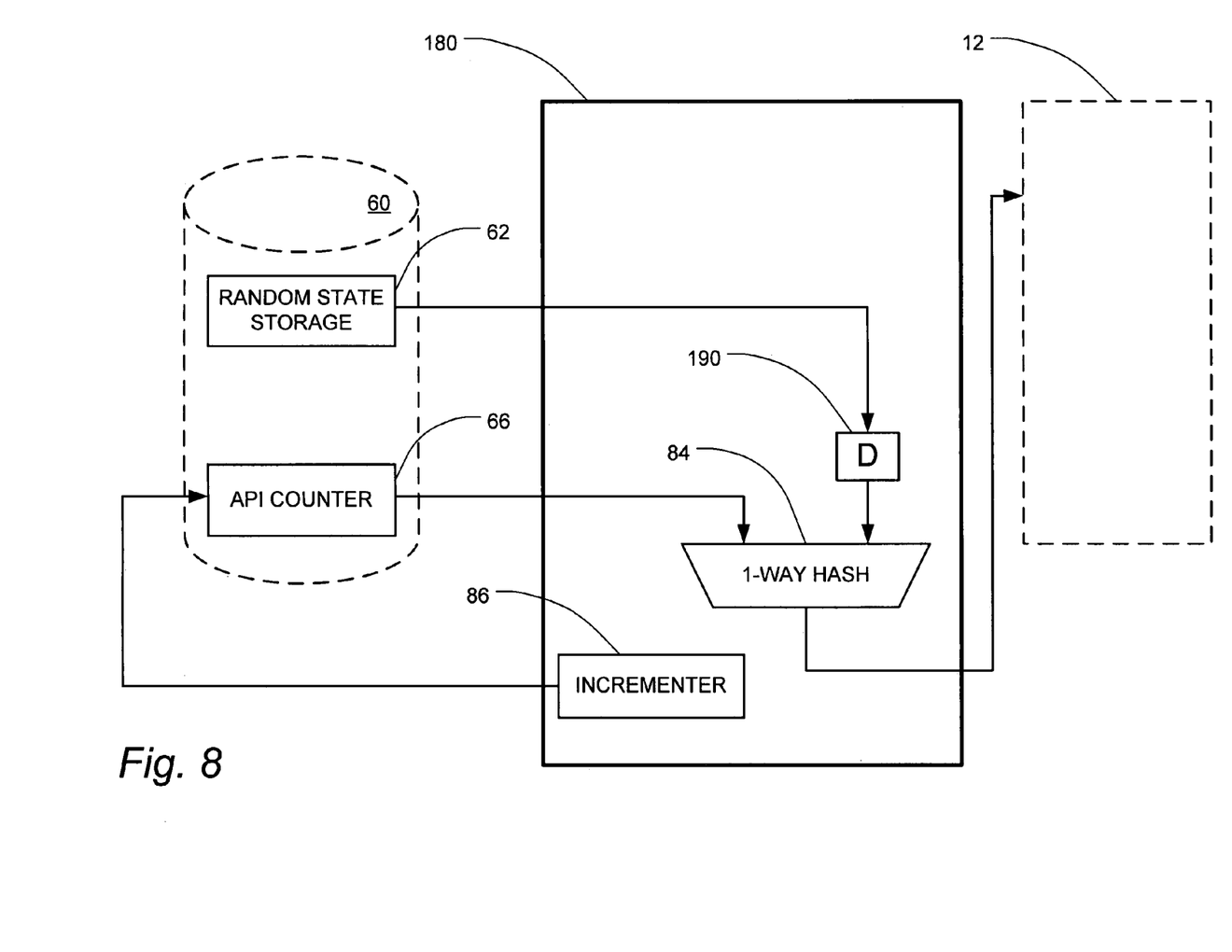
FIG. 8 is a block diagram of the alternative application programming interface of FIG. 6 and its interconnection to the computer's operating platform and the storage facility.

FIG. 8 is a block diagram of the alternative API 180 of FIG. 6 and its interconnection to the computer's operating platform 14 and the storage facility 60. This API 180 is designed for use with the alternative randomness accumulation facility 140 of FIG. 7. Once again, the API 180 includes a second one-way hash element 84 and a second incrementer 86, each of which is similar to, and carries out the same function as, the corresponding element of the API 80 of the embodiment of FIG. 4. However, because the value in the random state storage 62 has now been encrypted, the alternative API 180 further includes a third cryptographic element 190, which is a decryption element, interposed between the output of the random state storage 62 and the one-way hash 84. In operation, the third cryptographic element 190 decrypts the value stored in the random state storage 62 before providing it to the second one-way hash element 84. The third cryptographic element 190 thus prevents an unauthorized person, application or other entity from predicting a "random" number (i.e., the output of the second one-way hash element 84) by compromising the random state storage 62. In other words, if an unauthorized entity is somehow able to break into the computer system in which the present is embodied and is able to thereby learn the value stored in the random state storage 62 at any given time, the entity will still be unable to predict the output of the decryption element 190 without knowledge of the decryption key used by that element 190. As a result, the unauthorized entity will be unable to predict the input to the hash element 190 and thus will be likewise unable to predict the output of the hash element 190 either.

Preferably, the three cryptography elements 148, 150, 190 are matched to each other such that the respective encryption and decryption elements utilize the same cryptographic process and the same key or corresponding portions of a key pair. Thus, the output of the second decryption element 190 will be the same as the output of the first one-way hash element 44, having been encrypted and decrypted using corresponding processes and keys. However, it will be apparent to those of ordinary skill in the art that since the purpose of the random number generator 120 is to provide random rather than specific data, different cryptographic processes and keys may instead be used to create output data that may not correspond directly to input data, but which is highly random nonetheless. However, conventional techniques often utilize such matching encryption/decryption processes and keys, even though it is not necessary for such processes and keys to match, in order to provide a "cleaner" approach to the design, thus aiding both in clarity and in the important area of "provable security." More specifically, it is well known in the field of random number generation that for a particular process or device to be useful, it must be highly provable. Mathematically "proving" randomness is a difficult task; however, it may be made somewhat easier by using matching cryptographic processes and keys, as described above.

Other than the incorporation of the cryptographic elements 148, 150, 190, the operation of the alternative embodiment of the API 180 is similar to that of the first embodiment.

If keys are required for the respective cryptographic elements 148, 150, 190, they may be "hardwired" into the random data generator 120 or may be specified and controlled by a privileged user. The use and applicability of such keys is preferably limited to the random number generator 120 itself; the keys are preferably not shared outside the random number generator 120.

It will also be readily apparent that although not implemented in the embodiments illustrated herein, the values in the respective counters 64, 66 may likewise be stored in an encrypted state, in which case additional cryptographic elements (not shown) may be included to provide appropriate encryption and decryption functionality.

Further, although likewise not shown, either of the embodiments of the random number generator 20, 120 may further incorporate a randomness tester (not shown) to monitor the quality of the values created and stored in the random state storage 62 on an ongoing basis. Appropriate actions may be taken if at a particular time the quality of randomness is deemed not adequate. The test results may also be used as a quality indicator that can be queried by applications 12. The design and implementation of such a randomness tester and interface will be apparent to those of ordinary skill in the art.

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

What is claimed is:

1. A random number generator, comprising:
   one or more pseudorandom data sources that generate first data;
   random state storage that receives and stores a random number; and
   a one-way hash element, whose output is coupled to the input of the random state storage, that hashes first data from the one or more pseudorandom data sources with a current random value from the random state storage,
   wherein the hashed result from the one-way hash element is loaded into the random state storage as a new random value, and wherein the one-way hash element is a first one-way hash element, the random number generator further comprising a second one-way hash element that receives the current random value from the random state storage and hashes the current random value with a separate value, the output of the second one-way hash element being designated as the random number that is provided as an output by the random number generator.

2. The random number generator of claim 1, further comprising a counter whose current value is the separate value with which the current random value, from the random state storage, is hashed by the second one-way hash element.

3. The random number generator of claim 2, wherein the counter is incremented each time a new random number is provided by the random number generator.

4. The random number generator of claim 2, wherein the counter resides in non-volatile memory and is restored to a previous value upon restart.

5. A random number generator, comprising:
   one or more pseudorandom data sources that generate first data;
   random state storage that receives and stores a random number; and
   a one-way hash element, whose output is coupled to the input of the random state storage, that hashes first data from the one or more pseudorandom data sources with a current random value from the random state storage,
   wherein the hashed result from the one-way hash element is loaded into the random state storage as a new random value, and wherein the current random value is stored in the random state storage in encrypted form, and wherein the random number generator further comprises a decryption element interposed between the random state storage and the one-way hash element for decrypting the current random value before being hashed by the one-way hash element.

6. The random number generator of claim 5, further comprising an encryption element, interposed between the output of the one-way hash element and the input of the random state storage, that encrypts the hashed result from the one-way hash element before the hashed result is loaded into the random state storage.

7. A random number generator, comprising:
   one or more pseudorandom data sources that generate first data;
   random state storage that receives and stores a random number; and
   a one-way hash element, whose output is coupled to the input of the random state storage, that hashes first data from the one or more pseudorandom data sources with a current random value from the random state storage,
   wherein the hashed result from the one-way hash element is loaded into the random state storage as a new random value, and further comprising an encryption element, interposed between the output of the one-way hash element and the input of the random state storage, that encrypts the hashed result from the one-way hash element before the hashed result is loaded into the random state storage.

8. The random number generator of claim 7, wherein the hashed result from the one-way hash element is loaded into the random state storage as a new random value.

9. The random number generator of claim 8, further comprising a counter whose output is received by the one-way hash element, wherein the current value of the counter is hashed, by the one-way hash element, with the first data and the current value contained in the random state storage.

10. The random number generator of claim 9, wherein the counter is incremented each time a new value is loaded from the output of the one-way hash element into the random state storage.

11. The random number generator of claim 9, wherein the counter resides in non-volatile memory and is restored to a previous value upon restart.

12. The random number generator of claim 8, further comprising a query manager, interposed between the one or more pseudorandom data sources and the one-way hash element, that gathers pseudorandom data from the one or more pseudorandom data sources and provides it to the one-way hash element.

13. The random number generator of claim 12, wherein the query manager includes a polling scheduler that determines when to gather pseudorandom data from each of the pseudorandom data sources.

14. The random number generator of claim 7, wherein the random state storage resides in non-volatile memory and is restored to a previous value upon restart.

15. A method of generating random data, comprising:
   generating pseudorandom data via one or more pseudorandom data sources;
   hashing the pseudorandom data with a stored value of random data;
   storing the result of the hashing step in a memory location for retrieval when a random number is requested; and
   repeating the generating, hashing and storing steps on an ongoing basis, wherein the stored value hashed in each subsequent hashing step is the result of a previous hashing step.

16. The method of claim 15, wherein hashing includes hashing the pseudorandom data with the stored value of random data from the memory location.

17. The method of claim 16, wherein:
   the memory location is a first memory location;
   the method further comprises storing the current value of a counter in a second memory location; and
   hashing includes hashing the pseudorandom data with the stored value of random data and the stored value of the counter.

18. The method of claim 17, further comprising:
   incrementing the counter whenever the hashing step is carried out.

19. The method of claim 16, further comprising:
   gathering pseudorandom data from the one or more pseudorandom data sources; and
   selecting a subset of the pseudorandom data to be hashed with the stored value of random data.

20. The method of claim 19, further comprising:
   determining when to gather pseudorandom data from each of the pseudorandom data sources.

21. The method of claim 16, further comprising:
   retrieving the stored value of random data from the memory location;

hashing the retrieved value with a separate value; and outputting the result of the foregoing hashing step as a random number.

22. The method of claim 21, wherein:

the memory location is a first memory location;

the method further comprises storing the current value of a counter in a second memory location; and hashing the retrieved value with a separate value includes hashing the retrieved value with the stored value of the counter.

23. The method of claim 22, further comprising:

incrementing the counter whenever the retrieved value is hashed with the stored value of the counter.

24. The method of claim 16, wherein the step of storing the result of the hashing step includes storing the result of the hashing step in the memory location in encrypted form.

25. The method of claim 24, further comprising:

decrypting the stored value of random data in the memory location before hashing the stored value with the pseudorandom data.

26. The method of claim 24, further comprising:

encrypting the result of the hashing step before storing the result in the memory location.

27. The method of claim 16, further comprising:

encrypting the result of the hashing step before storing the result in the memory location.

28. The method of claim 15, wherein storing the result of the hashing step includes storing the result of the hashing step in non-volatile memory, the method further comprising:

discontinuing the generating, hashing and storing steps by rebooting a computer;

restoring the previous stored value when the computer is restarted; and again repeating the generating, hashing and storing steps on an ongoing bais, wherein the stored value hashed with the pseudorandom data in the first hashing step after the computer is restarted is the restored previous value, and wherein the stored value hashed with the pseudorandom data in each subsequent hashing step is the result of a previous hashing step.

29. A random number generator, comprising:

one or more pseudorandom data sources that generate pseudorandom data;

random state storage that receives and stores a random number derived from the pseudorandom data that is generated by the one or more pseudorandom data sources; and a one-way hash element that receives a current random value from the random state storage and hashes the current random value with a separate value, the output of the one-way hash element being designated as the random number that is provided as an output by the random number generator and a counter whose current value is the separate value with which the current random value, from the random state storage, is hashed by the second one-way hash element.

30. The random number generator of claim 29, wherein the counter is incremented each time a new random number is provided as an output by the random number generator.

31. The random number generator of claim 29, wherein the counter is incremented each time the random state storage receives and stores a new random number.

32. The random number generator of claim 29, further comprising an incrementer that controls how the counter is incremented.

33. The random number generator of claim 29, wherein the counter resides in non-volatile memory and is restored to a previous value upon restart.

34. The random number generator of claim 29, wherein the current random value is stored in the random state storage in encrypted form, and wherein the random number generator further comprises a decryption element interposed between the random state storage and the one-way hash element for decrypting the current random value before being hashed by the one-way hash element.

35. The random number generator of claim 29, wherein the random state storage resides in non-volatile memory and is restored to a previous value upon restart.

36. A method of generating a random number, comprising:

generating pseudorandom data via one or more pseudorandom data sources;

deriving a random value from the pseudorandom data;

storing the random value in a memory location;

hashing the stored random value with a separate value; and outputting the hashed result as a generated random number, wherein at least the hashing and outputting steps are repeated on an ongoing basis, and wherein the separate value is changed before at least some of repeated hashing steps are executed, and, wherein the separate value is the value of a counter, the method further comprising:

incrementing the counter whenever the hashing step is carried out.

37. A method of generating a random number, comprising:

generating pseudorandom data via one or more pseudorandom data sources;

deriving a random value from the pseudorandom data;

storing the random value in a memory location;

hashing the stored random value with a separate value; and outputting the hashed result as a generated random number, wherein at least the hashing and outputting steps are repeated on an ongoing basis, and wherein the separate value is changed before at least some of repeated hashing steps are executed, and, wherein the separate value is the value of a counter, the method further comprising:

incrementing the counter whenever a new random value is stored in the memory location.

38. A method of generating a random number, comprising:

generating pseudorandom data via one or more pseudorandom data sources;

deriving a random value from the pseudorandom data;

storing the random value in a memory location;

hashing the stored random value with a separate value; and outputting the hashed result as a generated random number, wherein at least the hashing and outputting steps are repeated on an ongoing basis, and wherein the separate value is changed before at least some of repeated hashing steps are executed, and, wherein the step of storing the random value in a memory location includes storing a random value in a memory location in encrypted form.

39. The method of claim 38, further comprising:

decrypting the random value stored in the memory location before hashing the random value with the separate value.

40. A random number generating, comprising:

one or more pseudorandom data sources that generate pseudorandom data;

a randomness accumulation facility that receives pseudorandom data from the one or more pseudorandom data sources;

a storage facility that stores a random value generated by the randomness accumulation facility; and an application programming interface, operating independently from the operation of the randomness accumulation facility, that retrieves, upon reciuest by a software application, the random value currently stored in the storage facility and provides a random number to the software application, wherein the randomness accumulation facility defines a first module and the application programming interface defines a second module, and wherein at least one of the first and second modules includes a one-way hash element that hashes data received by the module and provides, as output, random data derived from the hashed output of the one-way hash element.

41. The random number generator of claim 40, wherein the first module includes a one-way hash element that hashes the pseudorandom data with a current random value from the storage facility.

42. The random number generator of claim 41, wherein the hashed result from the one-way hash element is loaded into the storage facility as a new random value.

43. The random number generator of claim 41, wherein the first module includes a query manager, interposed between the one or more pseudorandom data sources and the one-way hash element, that gathers pseudorandom data from the one or more pseudorandom data sources and provides it to the one-way hash element.

44. The random number generator of claim 43, wherein the query manager includes a polling scheduler that determines when to gather pseudorandom data from each of the pseudorandom data sources.

45. The random number generator of claim 40, further comprising a counter for each respective one-way hash element, wherein the output of the counter is received by the respective one-way hash element, and wherein the current value of the counter is hashed, by the one-way hash element, with the data received by the module in which the one-way hash element is included.

46. The random number generator of claim 45, wherein each respective counter is incremented when its corresponding one-way hash element carries out its hash operation.

47. The random number generator of claim 45, wherein the first module includes one of the one-way hash elements, such one-way hash element having an output coupled to an input of the storage facility and arranged to hash pseudorandom data from the one or more pseudorandom data sources with a current random value from the storage facility and the current value of the respective counter.

48. The random number generator of claim 45, wherein the second module includes one of the one-way hash elements, such one-way hash element arranged to hash a current random value from the storage facility with the current value of the respective counter.

49. The random number generator of claim 48, wherein the output of the one-way hash element of the second module is designated as the random number that is provided as an output by the random number generator.

50. The random number generator of claim 45, wherein the counter resides in non-volatile memory and is restored to a previous value upon restart.

51. The random number generator of claim 40, wherein the current random value is stored in the storage facility in encrypted form.

52. The random number generator of claim 51, wherein the randomness accumulation facility includes an encryption element that encrypts the generated random value before storing the random value in the storage facility.

53. The random number generator of claim 51, wherein the application programming interface includes a decryption element that decrypts the random value stored in the storage facility before providing it as a random number.

54. The random number generator of claim 40, wherein the random value is stored in non-volatile memory in the storage facility and is restored to a previous value upon restart.

55. A method of generating a random number, comprising:
generating pseudorandom data via one or more pseudorandom data sources;
hashing the pseudorandom data with a stored value of random data;
storing the result of the hashing step as a current random value in a memory location;
repeating the generating, hashing and storing steps on an ongoing basis, wherein the stored value hashed with the pseudorandom data in each subsequent hashing step is the result of a previous hashing step;
independently from the generating, hashing and storing steps, retrieving the current random value from the memory location;
hashing the retrieved random value with a separate value; and
outputting the hashed result as a generated random number.

56. The method of claim 55, wherein the step of hashing the pseudorandom data with a stored value of random data includes hashing the pseudorandom data with a stored value of random data and with a counter value, the method further comprising:
incrementing the counter value each time the counter value is hashed.

57. The method of claim 55, wherein the step of hashing the retrieved random value with a separate value includes hashing the retrieved random value with a counter value, the method further comprising:
incrementing the counter value each time the counter value is hashed.

58. The method of claim 55, further comprising:
encrypting, before storing the current random value in the memory location, the result of the step of hashing the pseudorandom data with a previously-stored value of random data.

59. The method of claim 58, further comprising:
decrypting, before hashing the retrieved random value with a separate value, the retrieved random value.

60. The method of claim 55, wherein storing the result of the hashing step includes storing the result of the hashing step in a memory location in non-volatile memory, the method further comprising:
discontinuing the generating, hashing and storing steps by rebooting a computer;
restoring the previous stored current random value when the computer is restarted; and
again repeating the generating, hashing and storing steps on an ongoing basis, wherein the stored value hashed with the pseudorandom data in the first hashing step after the computer is restarted is the restored previous value, and wherein each subsequent hashing step is the result of a previous hashing step.

* * * * *

UNITED STATES PATENT AND TRADEMARK OFFICE
CERTIFICATE OF CORRECTION

PATENT NO. : 7,546,327 B2
APPLICATION NO. : 11/018806
DATED : June 9, 2009
INVENTOR(S) : Yuliang Zheng

It is certified that error appears in the above-identified patent and that said Letters Patent is hereby corrected as shown below:

Col. 15, in Claim 28, line 36 delete "bais" and insert therefor --basis--.

Col. 16, in Claim 40, line 62 delete "generating" and insert therefor --generator--.

Signed and Sealed this

First Day of December, 2009

David J. Kappos
*Director of the United States Patent and Trademark Office*